US007463438B2

(12) United States Patent
Kosugi et al.

(10) Patent No.: US 7,463,438 B2
(45) Date of Patent: Dec. 9, 2008

(54) INFORMATION STORAGE APPARATUS, AND CONTROL METHOD AND PROGRAM FOR THE SAME

(75) Inventors: Tatsuhiko Kosugi, Kawasaki (JP); Masahide Kanegae, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 275 days.

(21) Appl. No.: 11/043,492

(22) Filed: Jan. 26, 2005

(65) Prior Publication Data

US 2006/0082918 A1 Apr. 20, 2006

(30) Foreign Application Priority Data

Oct. 15, 2004 (JP) ............................ 2004-301011

(51) Int. Cl.

| | |
|---|---|
| ***G11B 27/36*** | (2006.01) |
| ***G11B 5/09*** | (2006.01) |
| ***G11B 21/02*** | (2006.01) |
| ***G11B 5/596*** | (2006.01) |

(52) U.S. Cl. ............................ 360/31; 360/53; 360/75; 360/77.05

(58) Field of Classification Search ....................... None
See application file for complete search history.

(56) References Cited

U.S. PATENT DOCUMENTS

| | | | | |
|---|---|---|---|---|
| 5,459,701 | A | 10/1995 | Tokita et al. | |
| 6,260,257 | B1 * | 7/2001 | Emo et al. | 324/210 |
| 6,633,442 | B2 * | 10/2003 | Quak et al. | 360/31 |
| 6,989,951 | B2 * | 1/2006 | Lee et al. | 360/51 |
| 2002/0036852 | A1 * | 3/2002 | Leow et al. | 360/31 |

FOREIGN PATENT DOCUMENTS

| | | |
|---|---|---|
| JP | 04-328369 | 11/1992 |
| JP | 5-20721 | 1/1993 |
| JP | 5-94674 | 4/1993 |
| JP | 05-205419 | 8/1993 |
| JP | 5-205419 | 8/1993 |
| JP | 06-274806 | 9/1994 |
| JP | 8-279163 | 10/1996 |
| JP | 2000-357379 | 12/2000 |
| JP | 2002-170348 | 6/2002 |
| JP | 2002-230929 | 8/2002 |

* cited by examiner

*Primary Examiner*—Joseph H. Feild
*Assistant Examiner*—Daniell L Negrón
(74) *Attorney, Agent, or Firm*—Greer, Burns & Crain, Ltd.

(57) ABSTRACT

An information storage apparatus that records servo information and user data on a recording face of a recording medium wherein a track density measuring unit measures the optimal track density for a recording face corresponding to each head targeting a storage medium on which the servo information has not yet been recorded and a recording density measuring unit measures the optimal linear density for each recording face. A servo frame writing unit writes the servo information varying a track pitch to a track pitch corresponding to the optimal track density measured by the track density measuring unit and a recording frequency to a recording frequency corresponding to the optimal linear density measured by the linear density measuring unit, for each head.

15 Claims, 12 Drawing Sheets

10
12
DISK ENCLOSURE
14
CONTROL BOARD
24
HEAD IC
26
READ/WRITE LSI
28
HARD DISK CONTROLLER
30
HOST INTERFACE
32
SD-RAM
34
MPU
TRACK DENSITY MEASURING UNIT 100
LINEAR DENSITY 102
SERVO FRAME WRITING UNIT 104
SEEK CONTROL UNIT 106
36
FLASH ROM
38
VCM/SPM CONTROLLER
VCM
18
SPM
16
22−1
22−2
22−3
22−4
20−1
20−2

1 SECTOR
46-1
46-2
46-3
46-4
46-15
46-16
50-1
50-2
50-3
50-14
50-15
50-16
0
123
141
237
243
288
384
402
R/W RECOVERY AREA
GRAY CODE AREA (CYLINDER ADDRESS)
AGC AREA
A
B
C
D
60
62
64
66
68
72
74
76
78
80
70

46-3
46-2
46-1
48-3
48-2
48-1
P2
25-3
45-2
22-3
46-3
46-2
46-1
48-3
48-2
48-1
P1
25-1
45-1
22-1

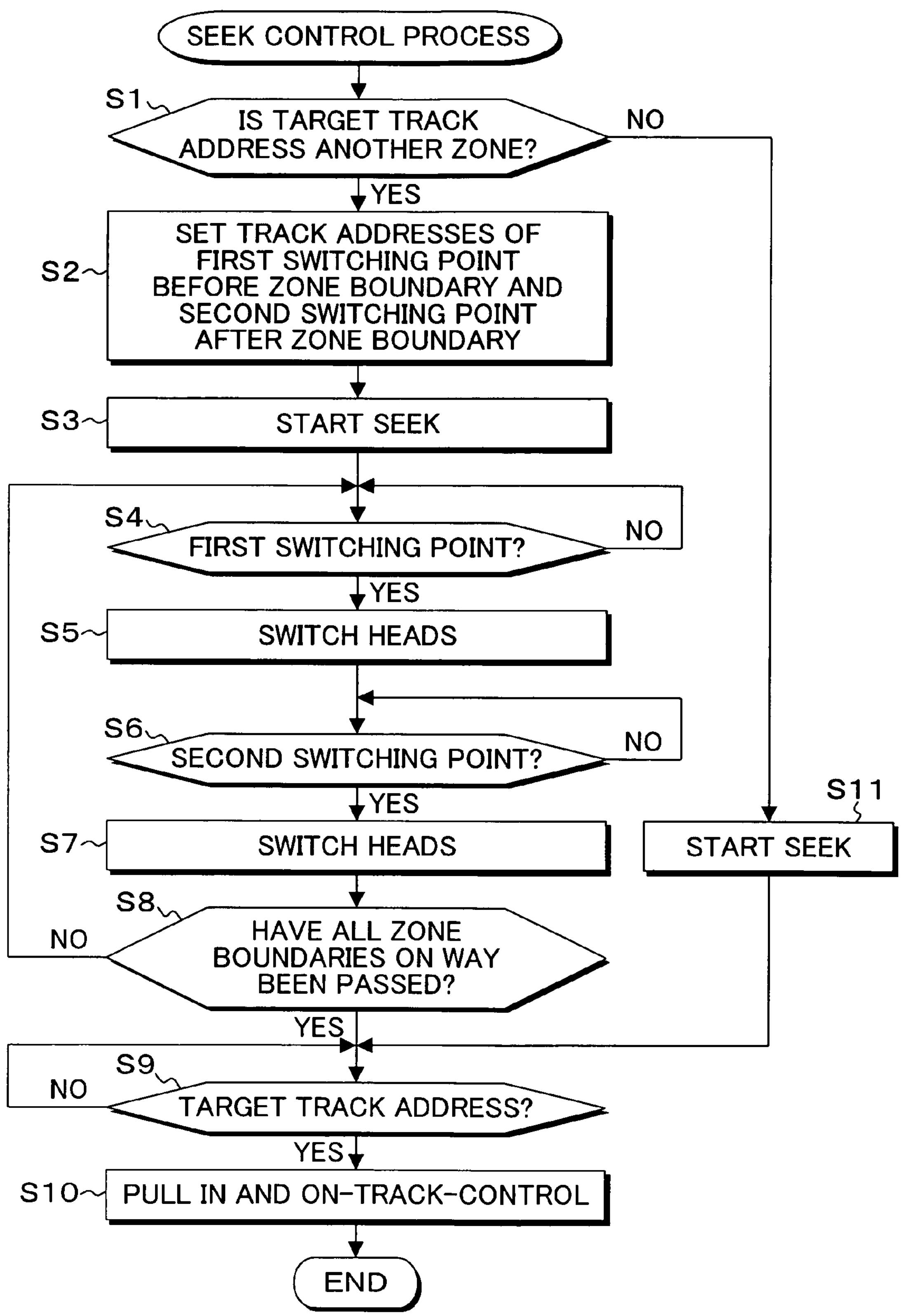
FIG. 12
SEEK CONTROL PROCESS
S1
IS TARGET TRACK ADDRESS ANOTHER ZONE?
NO
YES
S2
SET TRACK ADDRESSES OF FIRST SWITCHING POINT BEFORE ZONE BOUNDARY AND SECOND SWITCHING POINT AFTER ZONE BOUNDARY
S3
START SEEK
S4
FIRST SWITCHING POINT?
NO
YES
S5
SWITCH HEADS
S6
SECOND SWITCHING POINT?
NO
YES
S7
SWITCH HEADS
S11
START SEEK
S8
HAVE ALL ZONE BOUNDARIES ON WAY BEEN PASSED?
NO
YES
S9
TARGET TRACK ADDRESS?
NO
YES
S10
PULL IN AND ON-TRACK-CONTROL
END

INFORMATION STORAGE APPARATUS, AND CONTROL METHOD AND PROGRAM FOR THE SAME

CROSS-REFERENCE TO RELATED APPLICATION

This application claims the benefit of priority from prior application No. JP 2004-301011, filed Oct. 15, 2004, in Japan.

BACKGROUND OF THE INVENTION

1. Field of the Invention

The present invention relates generally to an information storage apparatus employing an embedded servo scheme for recording servo information and user data into a recording face of a storage medium and to a control method and program for the information storage apparatus, and more particularly, to an information storage apparatus provided with a self-servo writing feature for writing servo information into an unrecorded disk medium by the apparatus itself and to a control method and program for the same.

2. Description of the Related Art

Conventionally, the embedded servo scheme for recording servo information together with user data onto a recording face of a magnetic disk provided to a magnetic disk apparatus records servo frames as servo information for each predetermined angle in the direction along the circumference using a clock at the same frequency regardless of the differences in head, cylinder and sector. Similarly, even in a magnetic disk apparatus that divides a magnetic recording face of a magnetic disk into a plurality of zones in the direction of the radius, servo frames are recorded using a clock at a frequency determined for each zone regardless of the differences in head, cylinder and sector. On the other hand, the recording of servo frames onto the magnetic disk is executed using a dedicated servo track writer equipment during a manufacturing process of the disk apparatus. That is, a disk assembly is mounted on a bed of a servo track writer and the servo frames are written being synchronized with the clock while a high precision distance measurement is being executed from the exterior using a laser beam and a head is being moved for each track as unit one after another. Because the writing of the servo frames by the servo track writer needs dedicated manufacturing equipment and increases the cost of manufacturing, a magnetic disk apparatus has been also proposed that is provided with a self-servo writing function for recording servo frames on an unrecorded magnetic disk by the magnetic disk apparatus itself.

However, in the conventional magnetic disk apparatus that records servo frames at a constant recording density, the servo frames are written at a clock frequency of the same frequency regardless of the difference in head, cylinder and sector. Therefore, from the viewpoint of the recording density, the recording density becomes lower in the outer portion and higher in the inner portion. In addition, because a clock frequency obtained by compromising those two (2) densities is selected in the designing stage, the clock frequency is not always an optimal recording frequency for the inner and outer portions and this is one of the factors that degrades the signal quality and prevent increase of the recording density. Furthermore, from the viewpoint of a head, the optimal recording density, i.e., the balance between a track density TPi (Track per inch) and a linear density Bpi (BiTPer inch) is different for each head due to the dispersion in size and arrangement of writing cores and reading cores. However, a constant recording density, i. e., a track pitch and a recording frequency, that satisfy the lower limit of the performance of a head is determined in the designing stage and even a high performance head can only be used for the recording density at the lower limit of the performance thereof. Therefore, a problem arises that the recording density is degraded by the extent of limitation.

SUMMARY OF THE INVENTION

The object of the present invention is to provide an information storage apparatus and a control method and a program thereof that improve the signal quality by increasing the recording capacity by recording servo frames that are optimized for the difference in head, cylinder and sector.

The present invention provides an information storage apparatus that records servo information and user data on a recording face of a storage medium, the information storage apparatus comprising a recording density measuring unit configured to measure an optimal recording density of a recording face corresponding to each head for a storage medium having no servo information recorded thereon; and a servo information writing unit (servo frame writing unit) configured to vary a recording density for each head such that the recording density reaches the optimal recording density measured by the recording density measuring unit, to thereby write the servo information onto the storage medium having no servo information recorded thereon.

The recording density measuring unit includes a track density measuring unit arranged to measure an optimal track density of a recording face corresponding to each head; and a linear density measuring unit arranged to measure an optimal linear density for each recording face, and the servo information writing unit writes the servo information, for each head, varying a track pitch to a track pitch corresponding to the optimal track density measured by the track density measuring unit and varying a recording frequency to a recording frequency corresponding to the optimal linear density measured by the linear density measuring unit. The recording density measuring unit measures a respective optimal recording density for each of a plurality of zones obtained by radially dividing the recording face, and for each of the zones of the recording face, the servo information writing unit writes the servo information varying the recording density for each head such that the recording density reaches the optimal recording density. In case of this zone dividing, the recording density measuring unit includes a track density measuring unit arranged to measure an optimal track density of a recording face corresponding to each head; and a linear density measuring unit arranged to measure an optimal linear density for each zone, and the servo information writing unit writes the servo information, for each zone, varying a track pitch to a track pitch corresponding to the optimal track density measured by the track density measuring unit and varying a recording frequency to a recording frequency corresponding to the optimal linear density measured by the linear density measuring unit. The track density measuring unit:

writes first test data with a head moved to a predetermined position in the radial direction of the recording medium;

writes second test data at a position adjacent to the predetermined position with the head offset by one (1) track;

reads the first test data and determines whether or not a predefined error rate is satisfied;

if the error rate is satisfied, repeats the determination of error rate satisfaction by the writing of the second test data and the reading of the first test data, reducing gradually the offset of the second track until the error rate becomes unsatisfied; and determines the optimal track density based on the value of an offset immediately before an offset that does not satisfy the error rate.

The linear density measuring unit:

after setting a predetermined recording frequency and writing test data with the head moved to a predetermined position in the radial direction of the recording medium, reads the test data and determines whether or not a predefined error rate is satisfied;

if the error rate is satisfied, repeats the determination of error rate satisfaction by the writing of the test data and the reading of the test data, increasing gradually the recording frequency until the error rate becomes unsatisfied; and determines the optimal linear density based on a recording frequency immediately before a recording frequency that does not satisfy the error rate. In the information storage apparatus of the present invention, the servo information writing unit writes the servo information into recording faces of the recording medium such that positions of boundaries between zones in the radial direction having different recording densities are different from each other, the information storage apparatus further comprising a seek control unit configured to read the servo information switching the head such that the zone boundaries are detoured, during seeking operation that moves the head to the position of a target track reading the servo information on the recording face.

The present invention provides a control method for an information storage apparatus that records servo information and user data on a recording face of a storage medium. The control method for an information storage apparatus in accordance with the present invention comprises:

a recording density measuring step of measuring an optimal recording density of a recording face corresponding to each head for a storage medium having no servo information recorded thereon; and a servo information writing step of varying a recording density for each head such that the recording density reaches the optimal recording density measured at the recording density measuring step, to write the servo information onto the storage medium having no servo information recorded thereon.

The present invention provides a program executed by a computer of an information storage apparatus that records servo information and user data on a recording face of a storage medium. The program of the present invention is operable to drive the computer of the information storage apparatus to execute:

a recording density measuring step of measuring an optimal recording density of a recording face corresponding to each head for a storage medium having no servo information recorded thereon; and a servo information writing step of varying a recording density for each head such that the recording density reaches the optimal recording density measured at the recording density measuring step, to write the servo information onto the storage medium having no servo information recorded thereon.

The details of a control method and program for the information storage apparatus in accordance with the present invention are basically the same as those of the information storage apparatus of the present invention.

According to the present invention, servo frames as servo information corresponding to the dispersion of heads generated during the manufacturing thereof can be recorded for each apparatus. Furthermore, because designing is executed with a premise that, for example, the recording density of the servo frames is made variable for each zone, a drastic improvement of the signal quality can be expected. Yet furthermore, because the servo frames are recorded at an optimal recording frequency in each zone, the signal quality is improved and the dispersion of head generated during manufacture thereof can be absorbed and, therefore, the apparatus yield can be improved. In addition, as to seek operation for the case where the recording density of servo frames is varied, the position is lost when a zone boundary at which the servo frames are discontinued is crossed over. However, according to the present invention, the seek operation is executed on a recording face on which the servo frames are continued by switching heads such that the zone boundary at which the servo frames are discontinued is detoured. Therefore, the seek operation can be securely executed avoiding locations at which the servo frames are discontinued.

BRIEF DESCRIPTION OF THE DRAWINGS

FIG. 12 is a flowchart of the seek control process of the present invention for detouring the zone boundaries by switching the heads.

DESCRIPTION OF THE PREFERRED EMBODIMENT

Figure 1:
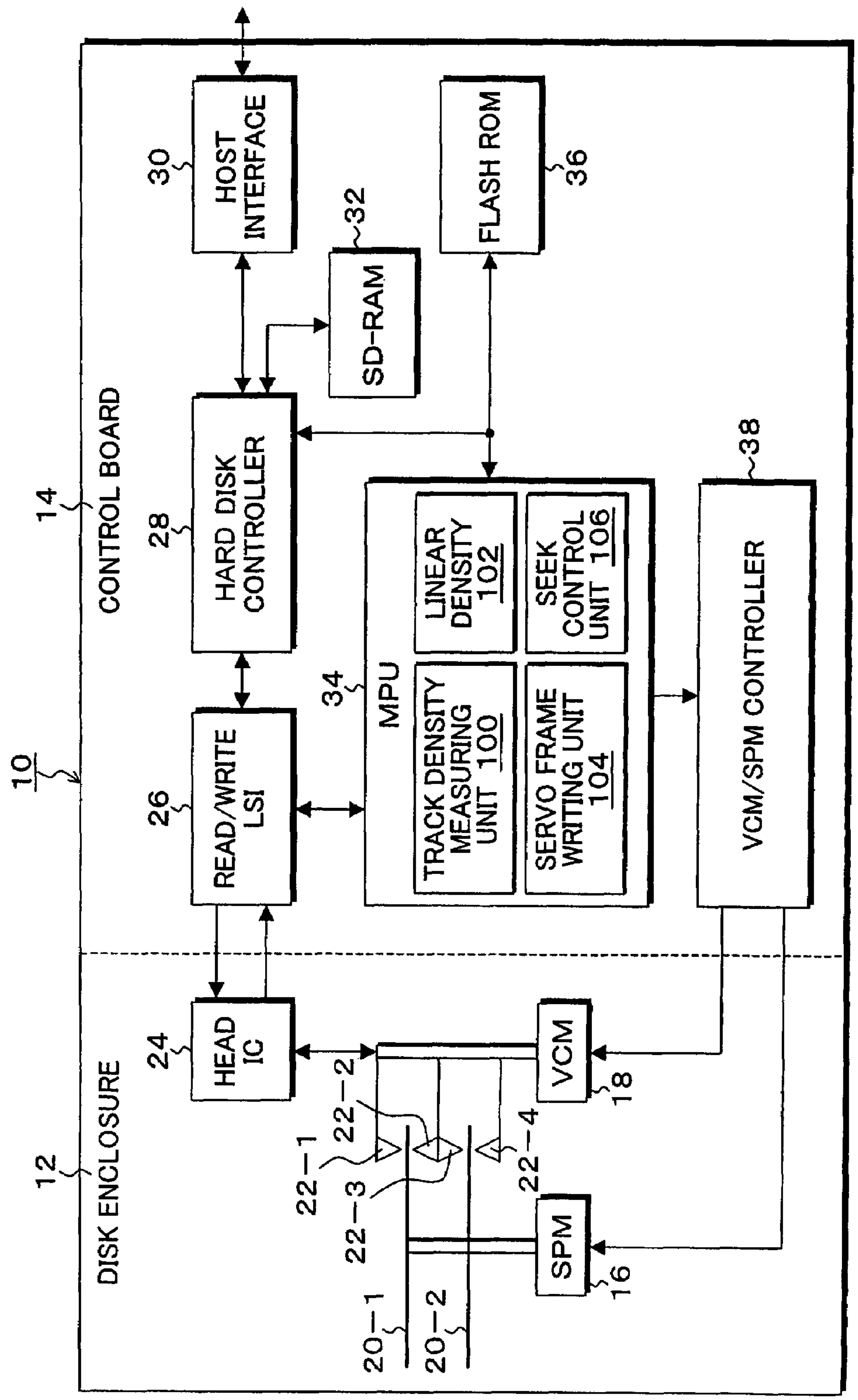
FIG. 1 is a block diagram of an embodiment of a hard disk drive according to the present invention that is provided with a self-servo writing function.

FIG. 1 shows a block diagram of a hard disk drive (HDD) 10 that is an information storage apparatus of the present invention provided with a self-servo writing function. In FIG. 1, the hard disk drive 10 comprises an enclosure 12 and a control board 14. The enclosure 12 is provided with a spindle motor (SPM) 16 and a voice coil motor (VCM) 18. Magnetic disk media 20-1 and 20-2 are attached to a rotary shaft of the spindle motor 16 and are rotated at a constant velocity. A head actuator is attached to the voice coil motor 18. Heads 22-1 to 22-4 are supported at the tip of an arm and execute reading and writing of information to disk faces that are recording faces of the magnetic disk media 20-1 and 20-2. Writing heads and reading heads are mounted integrally on the heads 22-1 to 22-4 through predetermined gaps. A head IC 24 is connected with each of the writing heads and the reading heads of the heads 22-1 to 22-4 through signal lines, selects any one (1) head based on a head selection signal from the control board 14 and executes writing or reading. For the magnetic disk media 20-1 to 22-2, the servo information is not recorded on each disk face at the time when manufacture of the hard disk drive 10 has been completed, and the servo information, i.e., the servo frames, is recorded on each disk face by servo writing operation after the completion of the manufacture. The control board 14 is provided with a read/write LSI 26, a hard disk controller (HDC) 28, a host interface 30, an SD-RAM 32, an MPU 34, a flash ROM and a VCM/SPM controller 38. As a function realized by executing a program for realizing the self-servo function, the MPU 34 is provided with a track density measuring unit 100, a linear density measuring unit 102 and a servo frame writing unit 104. Furthermore, supporting the writing of servo frames by dividing into zones, the MPU 34 is provided with a seek control unit 106 that executes head switching for detouring the zone boundary at which the recording frequency of the servo frames is discontinued. The track density measuring unit 100 and the linear density measuring unit 102 together constitute a recoding density measuring unit that measures the optimal recording density of a recoding face corresponding to each of the heads 22-1 to 22-4 targeting the magnetic disk media 20-1 and 20-2 on which the servo information is not yet recorded. The track density measuring unit 100 measures the optimal track density TPi for a corresponding recording face for each of the heads 22-1 to 22-4. The linear density measuring unit 102 measures the optimal linear density Bpi for each of the recording faces of the magnetic disk media 20-1 and 20-2. In this embodiment, each of the disk faces of the magnetic disk media 20-1 and 20-2 is divided into an outer zone and an inner zone obtained by dividing the disk face into two (2) in the direction of the radius thereof. Therefore, the linear density measuring unit 102 measures the optimal linear density Bpi for each of the zones. The servo frame writing unit 104 writes the servo frames as the servo information, varying the track pitch to a track pitch TP corresponding to the optimal track density TPi measured by the track density measuring unit 100 and varying the recording frequency to a recording frequency corresponding to the optimal linear density Bpi measured by the linear density measuring unit 102, for each of the heads 22-1 to 22-4. In addition, because each of the disk faces of the magnetic disk media 20-1 and 20-2 is divided into the outer zone and the inner zone, the servo frames are written varying the recording frequency for each of the zones. The seek control unit 106 reads the servo frames switching the heads such that the zone boundary is detoured, by the self-servo writing function thereof in the case where the zone boundary at which the recording frequency is discontinued is present on the way to the target track when the head is moved by executing a seek command based on a write command or a read command received from a host in the normal operation state after servo frames have been recorded on each of the disk faces of the magnetic disk media 20-1 and 20-2. A writing operation and a reading operation of the hard disk drive 10 after the servo frames have been written by the self-servo writing into the magnetic disk media 20-1 and 20-2 are as follows. Having received the write command and write data from a higher-order apparatus such as, for example, a personal computer connected through the host interface 30, the hard disk drive 10 buffers the write data into a SD-RAM 32 that acts as a transfer buffer and, thereafter, executes formatting of the write data and encoding for ECC using the hard disk controller 28. Then, the hard disk drive 10 executes a modulation process using a write data modulating unit that acts as a read channel, in the read/write LSI 26, thereafter, outputs a write signal to a head IC 24 and writes into the magnetic disk medium using a write head of a head selected at this time. During this operation, according to an order from the MPU 34 based on the write command, the VCM/SPM controller 38 executes on-track control by causing the head to seek a position on the medium designated by the write command, i.e., a target track by driving the voice coil motor 18 and, therefore, writing of the write data is executed at the position on the medium designated by the write command.

When the host interface 30 has received the read command from the higher-order apparatus, selection of a head by the head IC 24 by the MPU 34 is executed, and reading of data designated by the read command is executed by positioning on-track control by head seeking by driving the voice coil motor by the VCM/SPM controller 38. After a read-out signal from the magnetic disk medium has been pre-amplified by the head IC 24, read data are demodulated in a read data demodulating unit in the read/write LSI 26, and detection and correction of errors are executed by a decoding process of ECC in the hard disk controller 28. Thereafter, the read data are transferred to the higher-order apparatus from the host interface through buffering of the SD-RAM that acts as a transfer buffer.

Figure 2:
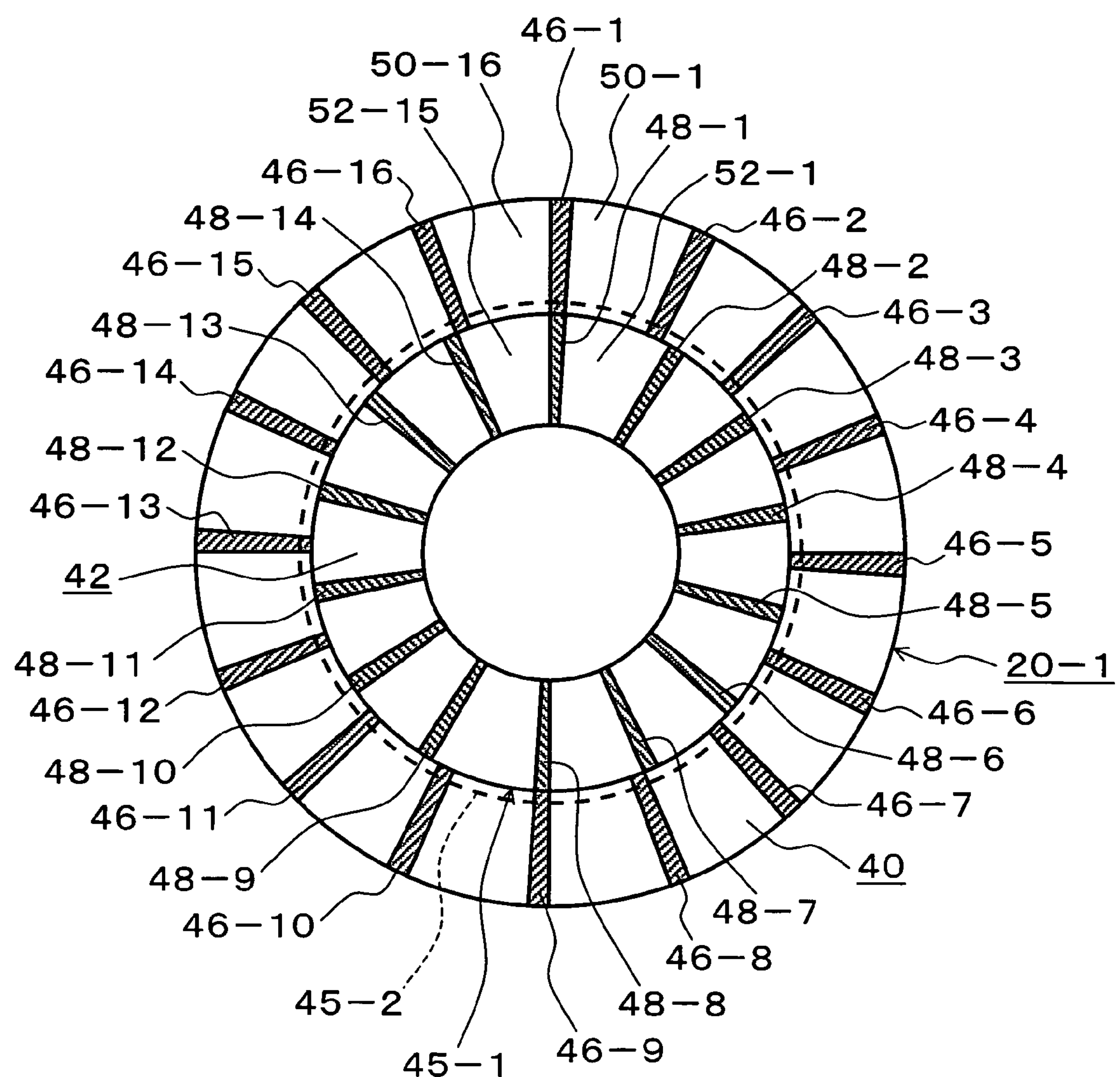
FIG. 2 is an explanatory view of a magnetic disk of FIG. 1 on which servo frames are recorded.

FIG. 2 is an explanatory view of the magnetic disk medium on which the servo frames are recorded by the self-servo writing in the hard disk drive 10 of FIG. 1. For the magnetic disk medium of FIG. 2, the disk face is divided into an outer zone 40 and an inner zone 42 divided by a zone boundary 45-1, by dividing the disk face into two (2) in the direction of the radius thereof. The track density measuring unit 100 and the linear density measuring unit 102 record a test pattern at a position in, for example, the zone center of each of the outer zone 40 and the inner zone 42 respectively using a head 22-1 corresponding to this disk face, and an adjacent test pattern is recorded at an adjacent position shifted by one (1) track pitch, that is a default to this test pattern. Next, an error rate is obtained by reading the first test pattern at the top of each zone and, when the error rate is satisfied, the track pitch of the adjacent track is narrowed and the adjacent test pattern is recorded. Then, this is repeated until the error rate is not satisfied and a track pitch immediately before a track pitch that does not satisfy the error rate is determined to be the track pitch that gives the optimal track density. Since the optimal track density measured by the track density measuring unit 100 is a value specific to the head 22-1, this value is a common value for both of the outer zone 40 and the inner zone 42. Whereas, the linear density measuring unit 102 obtains an error rate by reading the test pattern after writing the test pattern using a recording frequency of the default for, for example, each of the zone selection of the outer zone 40 and the inner zone 42 and, when the error rate is satisfied, corrects the recording frequency of the default to a higher frequency and writes the test pattern. Then, this is repeated until the error rate is not satisfied and the recording frequency used for writing a test pattern immediately before a test pattern by which error rate is not satisfied is determined to be the recording frequency that gives the optimal linear density. As to the track pitch corresponding to the optimal track density actually measured and the recording frequency corresponding to the optimal linear density actually measured, the values thereof are not used as they are and are used after correcting the values to values for which some margin is taken into account. When the track pitch TP optimal for the disk face has been determined and the optimal recording frequency has been determined for each of the outer zone 40 and the inner zone 42 as described above, the servo frame writing unit 104 shown inside the MPU of FIG. 1 executes writing of the servo frames from the outer-track side of the outer zone 40 that is the initial position at which the head is halted by the actuator. In the example of FIG. 2, 16 frames of servo frames 46-1 to 46-16 are recorded in the outer zone 40 and, sandwiched by the servo frames, data frames 50-1 to 50-16 that are user data areas divided into 16 locations are present. In contrast, as to the inner zone 42, because the determined optimal recording frequency is lower than that for the outer zone 40, though the servo frame 48-1 is written at a same position in the inner zone 42 as the location of the servo frame 46-1 having an index, in the outer zone 40, the servo frames 48-2 to 48-14 after that are recorded at positions shifted toward the delayed side relative to the servo frames 46-2 to 46-16 on the outer side by the amount corresponding to the extent the recording frequency is lowered. As a result, the outer zone 40 has the 16 servo frames whereas 14 servo frames are recorded into the inner zone 42. For simplicity of description, the number of the servo frames of FIG. 2 takes an example of the case where 16 frames, for example, are present in the outer zone 40. However, in practice, frames of the number of 72, for example, are written.

Figure 3:
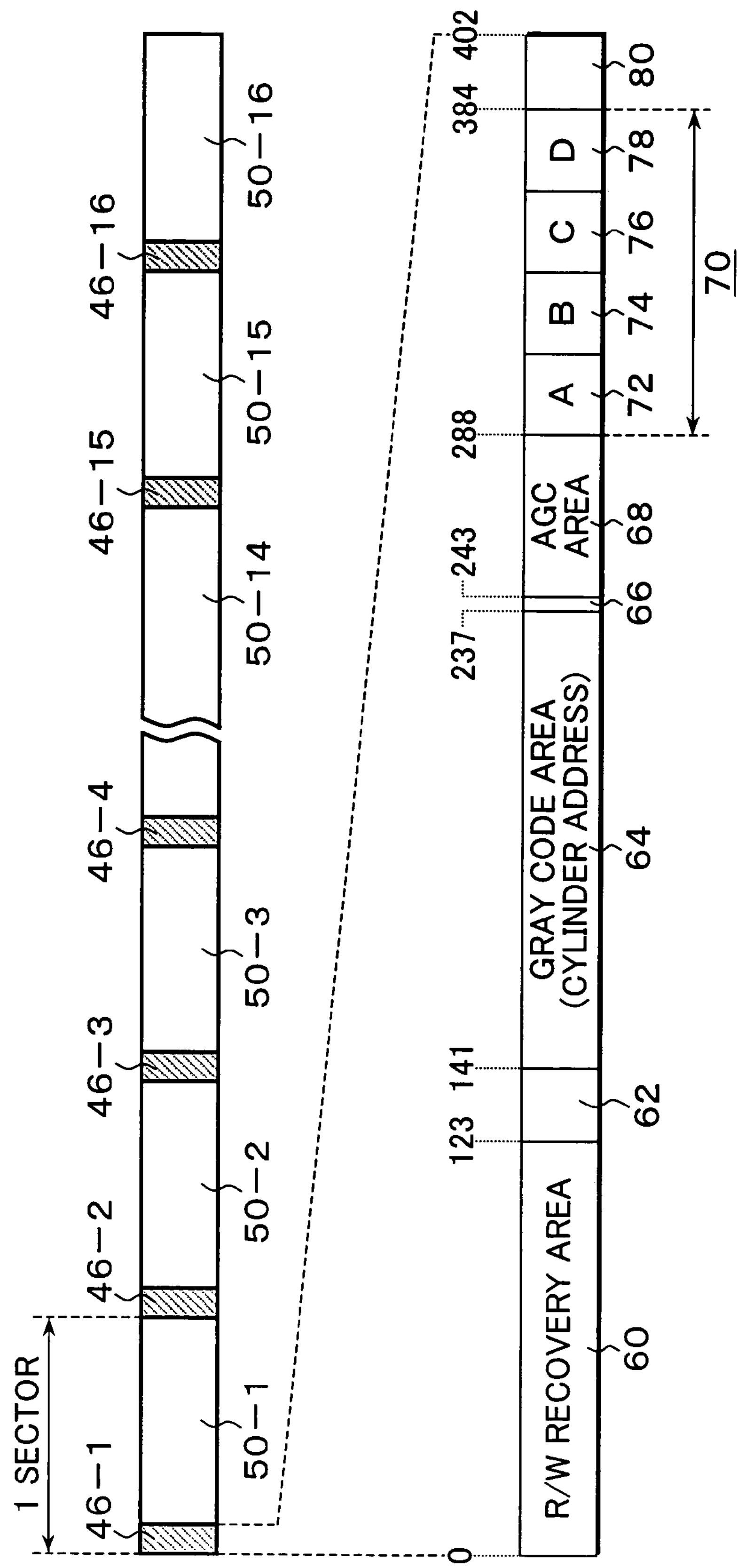
FIG. 3 is an explanatory view of a format of the servo frames of FIG. 1.

FIG. 3 is an explanatory view of a format for the servo frames of FIG. 2 and shows a format for servo frames for one (1) cylinder. In FIG. 3, a recording area for one (1) cylinder shown extended in a line is divided into, for example, 16 sectors. For a real magnetic disk medium, the recording area is divided into a sufficient number of sectors such as, for example, 72 sectors. The servo frames 46-1 to 46-16 are respectively provided at the head of each sector and the portion behind the head is respectively for the data frames 50-1 to 50-16. The data frames 50-1 to 50-16 are respectively areas for writing the user data following an ID section. The length of one (1) cylinder that is divided into 16 sectors is defined fixedly by a predetermined clock number using a reference clock and is, for example, 216000T where one (1) clock is represented by T. As shown enlarged in the lower portion of the figure, the servo frame 46-1 comprises an R/W recovery area 60, a servo mark area 62, a gray code area 64 representing a cylinder address, an index area 66, an AGC area 68, a servo area 70 and a gap area 80. The length of each area is represented in the reference clock period T and, for example, the length of the R/W recovery area 60 is 123T, the servo mark area 62 is 18T, the gray area 64 is 96T, the index area 66 is 6T, the AGC area 68 is 45T, the servo area 70 is 96T and the gap area 80 is 18T. In the servo area 70, bursts A, B, C and D are recorded being divided into a first field 72, a second field 74, a third field 76 and a fourth field 78, each having the length of 24T. The second and the latter servo frames 46-2 to 46-16 are respectively same as the servo frame 46-1 at the head except that, though magnetic recording is employed for the index area 66 of the servo frame 46-1 at the head, this magnetic recording is not employed for the those servo frames.

Figure 4:
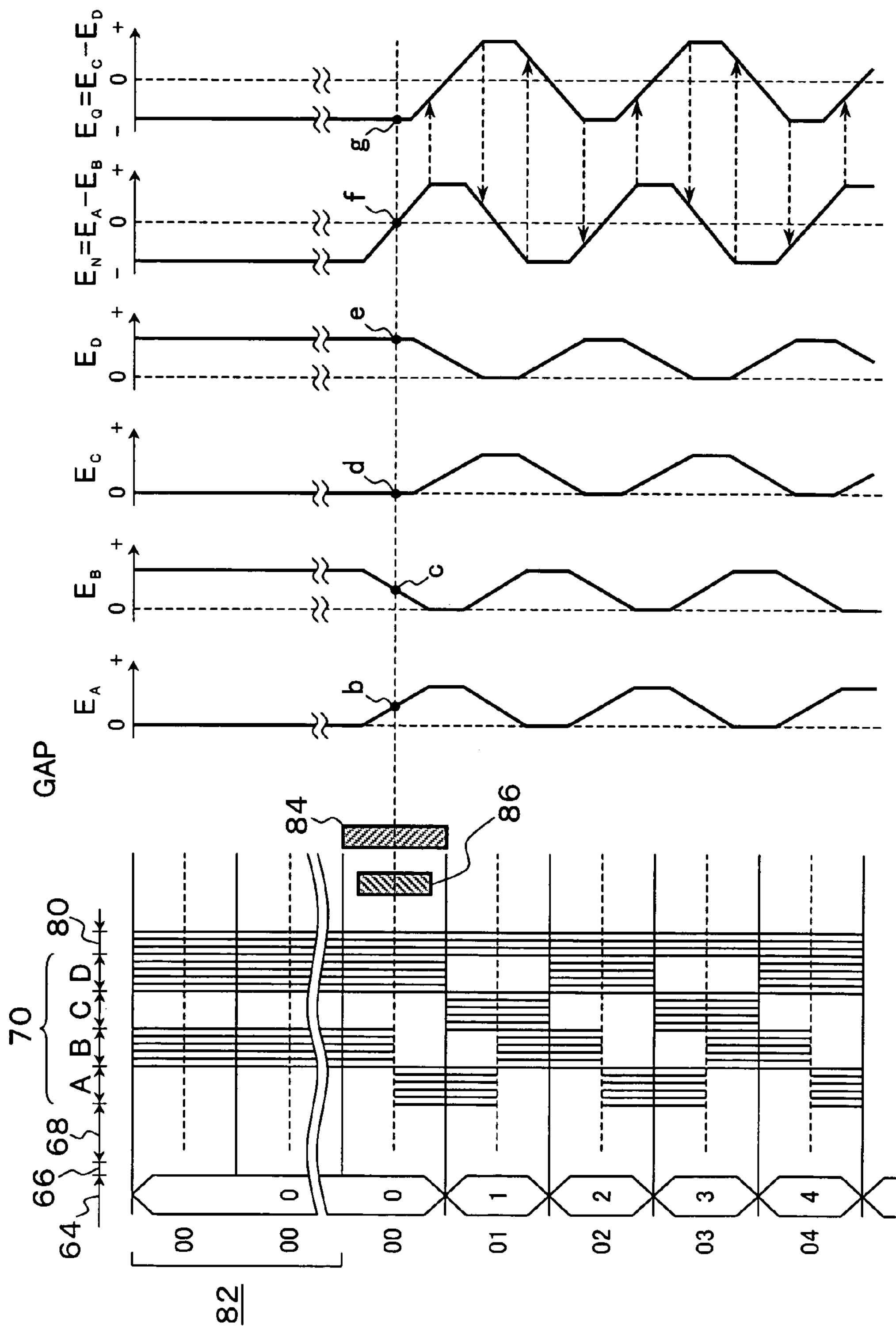
FIG. 4 is an explanatory view of recording in a servo area and detection of a head position signal of FIG. 3.

FIG. 4 shows a state of recording of the bursts A, B, C and D in the servo area 70 of FIG. 3 and generation of a head position signal based on a read signal of those bursts. The left side of FIG. 4 shows a plurality of servo frames on the outermost side of the magnetic disk medium taken in the direction of the radius thereof and physical cylinders are increased as advancing from the outer side to the inner side as 00, 01, 02, 03, . . . . A predetermined number of cylinders on the outermost side are assigned to a contact start/stop area (CSS) 82 and the physical cylinder addresses are all zero (0). In the case of a disk apparatus employing a dump loading scheme, the contact start/stop area 82 is not necessary. These physical cylinder addresses can be recognized with cylinder numbers represented in the gray code area 64 in the servo frame shown in FIG. 3. The bursts A, B, C and D are divided into a group of the bursts A and b, and a group of the bursts C and D. The bursts A and B are recorded in turns taking the center of a track depicted by the dotted lines as borders. Whereas the bursts C and D are recorded similarly in turns for each of the solid lines having 0.5 track offset. A write core 84 and a read core 86 that are provided to the head are shown at the position of the physical cylinder 00. Usually, the core width of the write core 84 is large and the core width of the read core 86 is small. In addition, the core centers are basically made to be located at the same position. However, core offset is generated, that is, the core centers of the write core 84 and the read core 86 are not located at the same position and are shifted relative to each other, because of the dispersion generated during the manufacture thereof. This core offset is measured in advance for each of the heads. Then, when the write core 84 is controlled to be on-track in the track center relative to the control for the read core 86 to be on-track in the track center, the write core 84 can be positioned in the track center by executing correction by the amount of the core offset. In such writing by the self-servo write operation of the bursts A, B, C and D in the servo frame 70, against the track pitch TP corresponding to the optimal track density measured by the track density measuring unit 100, the bursts A, B, C and D are written being offset by TP/2 for each track, that is a half of the track pitch TP, taking a track boundary on the outermost side of the contact start/stop area 82 as the initial position. That is, though servo frames other than the bursts A, B, C and D are written for every move to another track pitch TP that is the position indicated by the dotted lines indicating track centers, the bursts A, B, C and D are written for every offset of the head by TP/2 that is a half of the track pitch TP. That is, deviation of 0.5 track pitch in the direction of the disk radius is present between the burst A and the burst C and, similarly, deviation of 0.5 track pitch in the direction of the disk radius is also set between the burst B and the burst D. As shown in the figure, the read core 86 is, for example, controlled to be on-track in the track center indicated by the dotted line of the cylinder address 00. In the state where the read core 86 is controlled to be on-track at the cylinder address 00, a read signal obtained by the read core 86 is voltages b to e in read signals $E_A$, $E_B$, $E_C$ and $E_D$. These voltages can be obtained by peak-holding of the read signal from the read core 86. Ahead position signal $E_N$ is obtained by subtracting the read signal $E_B$ of the burst B from the read signal $E_A$ of the burst A. Similarly, a head position signal $E_Q$ is obtained by subtracting the read signal $E_D$ of the burst D from the read signal $E_C$ of the burst C. The two (2) head position signals $E_N$ and $E_Q$ (a two-tier position signal) produced as above have ranges indicated by the dotted lines that are used as effective data. In the self-servo writing of the present invention, the bursts A, B, C and Dare recorded into the servo area 70, thereafter, are read, the head position signals $E_N$ and $E_Q$ are obtained, the track pitch is detected from, for example, spacing of zero-cross points of the head position signal EN, whether or not recording has been executed at the correct track pitch is determined, if recording pitch is not correct, then offsets of the bursts A, B, C and D are corrected and writing is executed again, and all these are repeated until the correct track pitch is obtained. In the move of the head when servo frames are newly recorded by the self-servo writing into a magnetic disk face on which no servo frames have not been recorded yet, taking the starting point at the starting position in the outermost portion that is the starting position of servo frame writing for the head actuator, that is, the starting position in the outermost portion of the cylinder number 00 of the contact start/stop area 82, a driving current of the voice coil motor 18 for obtaining the optimal track pitch TP is obtained and the servo frames are written for a predetermined number of tracks in the initial stage on the outmost portion by control-by-current of the voice coil motor 18 that gives the amount of variation of the track pitch TP. For even such control-by-current of the voice coil motor that gives the amount of variation of the fixed track pitch TP as described above, offset correction, that is, correction of the current variation value as to whether or not the correct track pitch has been obtained is executed by reading the bursts A to D in a servo frame after writing thereof. Therefore, the servo frames can be recorded correctly with the spacing of the optimal track pitch TP from the outermost portion to the innermost portion.

Figure 5:
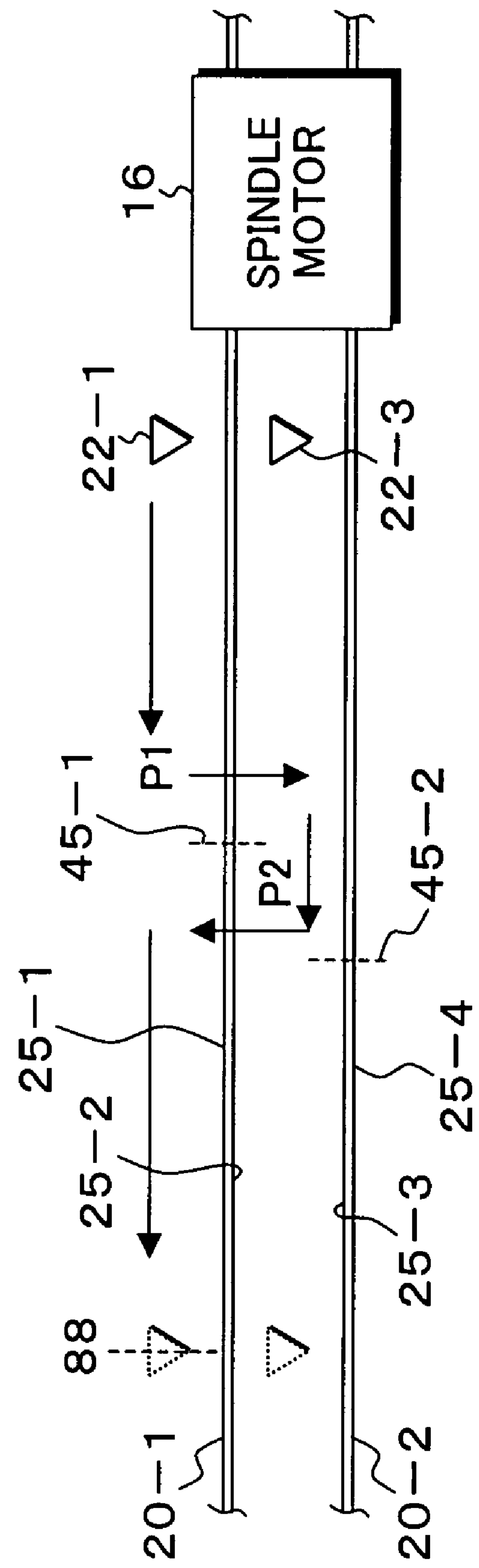
FIG. 5 is an explanatory view of seek control for detouring a zone boundary by switching the heads.

FIG. 5 is an explanatory view showing seek control of the hard disk drive 10 of FIG. 1, for detouring the zone boundary by switching the heads in seek control for moving the head to a target track when a write command or a read command has been received from the higher order apparatus in a normal operation after the servo frames have been recorded divided into the outer zone 40 and the inner zone 42 on the disk face of the magnetic disk medium by the self-servo writing as shown in FIG. 2. In FIG. 5, servo frames are written by the self-servo writing operation similarly to that of FIG. 2 into the magnetic disk media 20-1 and 20-2 each using both sides as recording faces. Here, the recording frequency is high on the outer zone side, whereas the recording frequency is low on the inner zone side. Therefore, the servo frames are discontinued at the zone boundaries 45-1 and 45-2. Hence, for example, when seek control for positioning the head 22-1 in the inner zone to a target track 88 in the outer zone is executed, servo information is cut off and the seek operation is failed because the servo frames are discontinued while the head 22-1 passes through the zone boundary 45-1. Then, in the present invention, the zone boundary 45-1 is detoured by switching the head 22-1 to another head, for example, the head 22-3. Because this zone boundary 45-1 is detoured, zone dividing has been executed such that the zone boundary 45-2 of the magnetic disk medium 20-2 corresponding to the switching destination head 22-3 is arranged to be at a position that is, for example, shifted toward the outer side. In the seek control for detouring this zone boundary 45-1, in the state where the head 22-1 is on-track that is currently on the inner side, when a write command and a read command are received from the host and it is recognized that the target track 88 is in another zone beyond the zone boundary 45-1, cylinder addresses that are switching points P1 and P2 have been set in advance before and after the zone boundary 45-1. Therefore, once the head 22-1 is caused to start seeking toward the target track 88, cylinder addresses obtained by reading of the servo frames by the head 22-1 are checked and, when the cylinder address of the first switching point P1 set before the zone boundary 45-1 is recognized, the head is switched to the head 22-3 of another magnetic disk medium 20-2 being moved by the seek operation simultaneously and a read signal of the servo frames is inputted. After switching to the head 22-3, arrival at the cylinder address of the second switching point P2 set after the zone boundary 45-1 is monitored and, when the arrival at the cylinder address of the second switching point P2 is recognized from the servo frame read signal of the head 22-3, head switching is executed from the head 22-3 to the original head 22-1 and a read signal of the servo frames is obtained.

Figure 6:
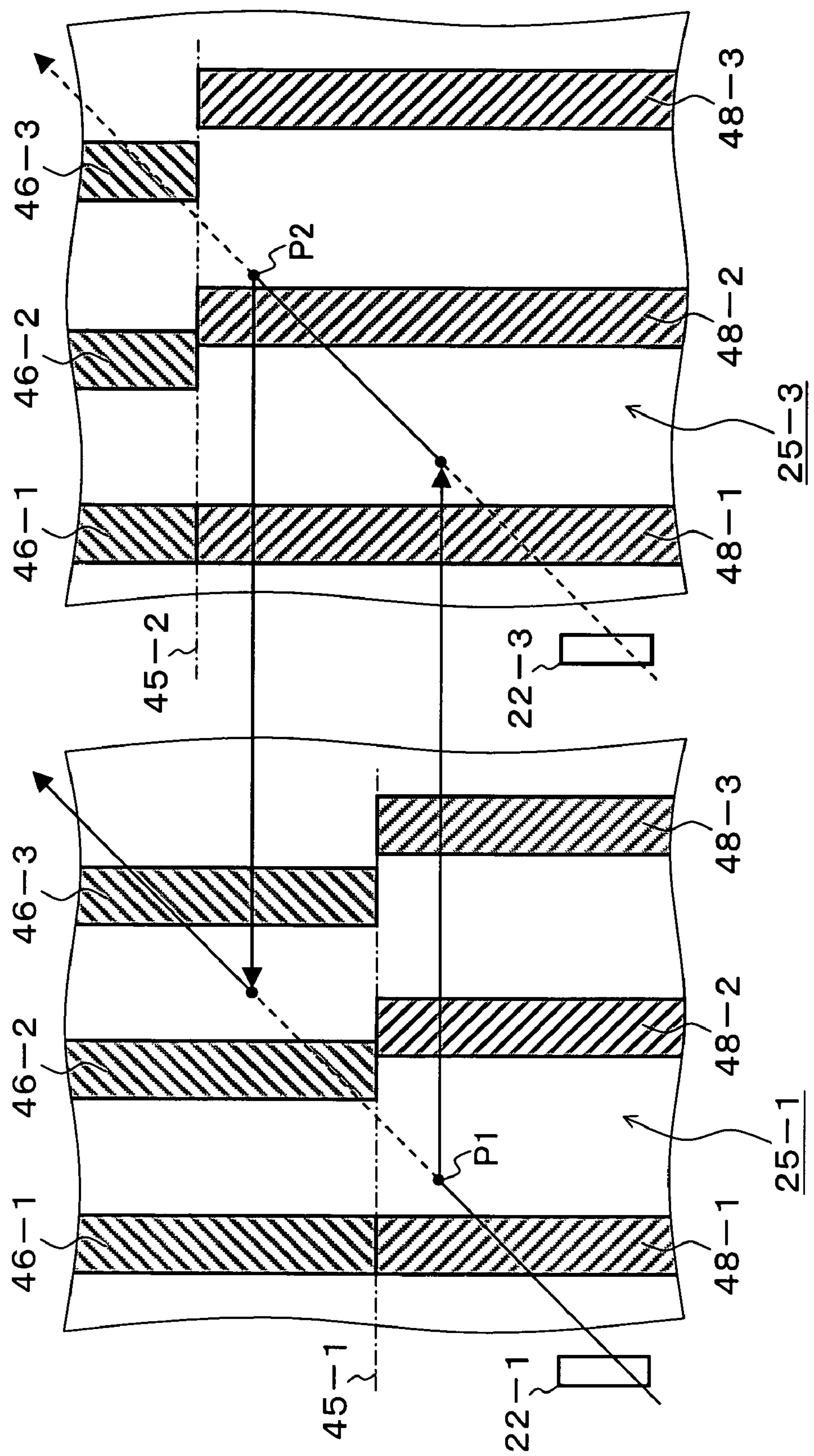
FIG. 6 is an explanatory view showing the seek control for detouring the zone boundary by switching the heads for the servo frames on a different recording face of FIG. 5.

FIG. 6 is a view of the seek control for detouring the zone boundary by switching heads for the servo frames on a different recording face of FIG. 5, using the track of the head on the disk face. The left side of FIG. 6 shows a disk face 25-1 corresponding to the head 22-1 and the right side shows a disk face 25-3 corresponding to the head 22-3 and, respectively, the servo frames 46-1 to 46-3 and the servo frames 48-1 to 48-3 are written divided into the outer portion and the inner portion. However, the zone boundaries 45-1 and 45-2 are shifted relative to each other such that the boundaries are not at the same position. In the case where the head 22-1 is currently seeking at a predetermined velocity toward a target track, when the head 22-1 has arrived at the first switching point P1, the head 22-1 is switched to the head 22-3 simultaneously seeking and, after switching to the head 22-3, when the head 22-3 has arrived at the second switching point P2, the head 22-3 is switched to the head 22-1 and the continuity of the read signal of the servo frames can be secured.

Figure 7A:
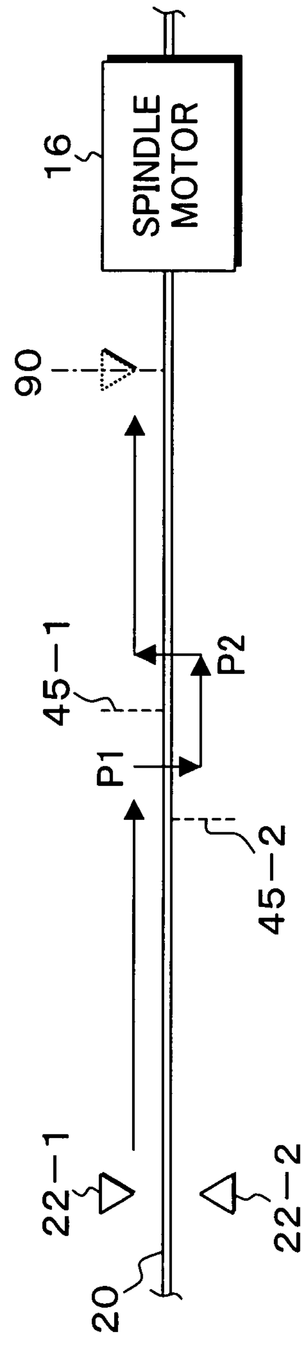
FIG. 7A is an explanatory view of the seek control for detouring the zone boundary by switching heads targeting double-side recording of a single medium.
Figure 7B:
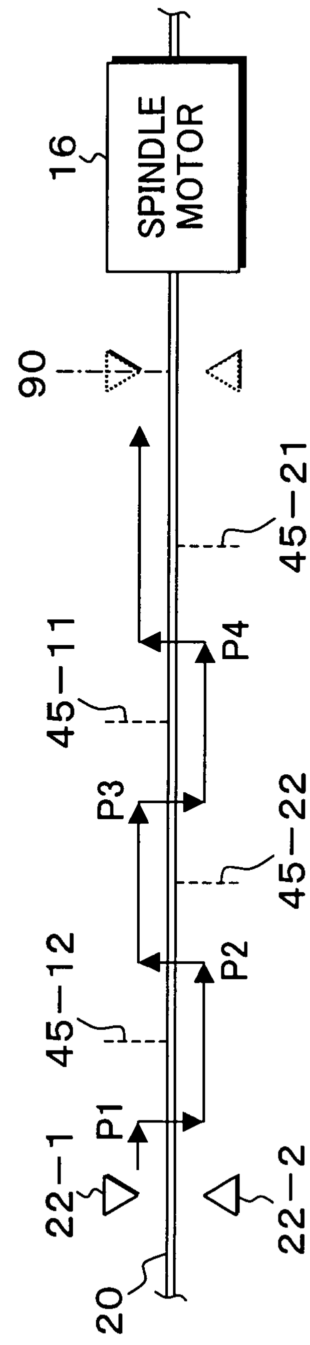
FIG. 7B is an explanatory view of the seek control for detouring the zone boundary by switching heads targeting double-side recording of a single medium.

FIGS. 7A and 7B are explanatory views of the seek control for detouring the zone boundaries by switching heads targeting double-side recording, taking an example of a single medium as the hard disk drive. In FIG. 7A, servo frames as shown in FIG. 2, for example, are recorded by the self-servo writing on both sides of the magnetic disk medium 20 and the zone boundary 45-2 in the lower side is shifted toward the outer side against the zone boundary 45-1 on a disk face on the upper side. Similarly, in the above case, when, for example, a write command and a read command are received at a position being on track of the head 22-1 on the outer side and seeking is executed toward a target track 90 on the inner side, because the zone boundary 45-1 is present on the way of the seeking, the discontinuity of the read signal of servo frames at the zone boundary 45-1 can be avoided by switching the head 22-1 to the head 22-2 on the lower side at the first switching point P1 before the zone boundary 45-1 and, thereafter, switching the head 22-2 to the original head 22-1 at the second switching point P2 after passing the zone boundary 45-1.

FIG. 7B is an explanatory view of the seek control for detouring zone boundaries by switching the heads in the case where each of two (2) sides of a single medium is respectively divided into three (3) zones. That is, in this case, similarly, the upper side of the magnetic disk medium 20 is divided into three (3) zones in the direction of the radius by zone boundaries 45-11 and 45-12 on the upper side and the lower side is divided into three (3) zones in the direction of the radius by zone boundaries 45-21 and 45-22 shifted against the zone boundaries 45-11 and 45-12 on the upper side. In this case, when, for example, the head 22-1 corresponding to the disk face on the upper side is moved to the target track 90 on the inner side by the seek control, the continuity of the read signal of the servo frames can be secured by detouring the zone boundaries 45-11 and 45-12 by executing head switching two (2) times such as that the head 22-1 is switched to the head 22-2 at the P1 point before the zone boundary 45-11, the head 22-2 is switched to the original head 22-1 at the P2 point located after passing the zone boundary 45-11, furthermore, the head 22-1 is switched to the head 22-2 at a P3 point before the zone boundary 45-2 and the head 22-2 is switched to the original head 22-1 at a P4 point located after passing the zone boundary 45-2.

Figure 8:
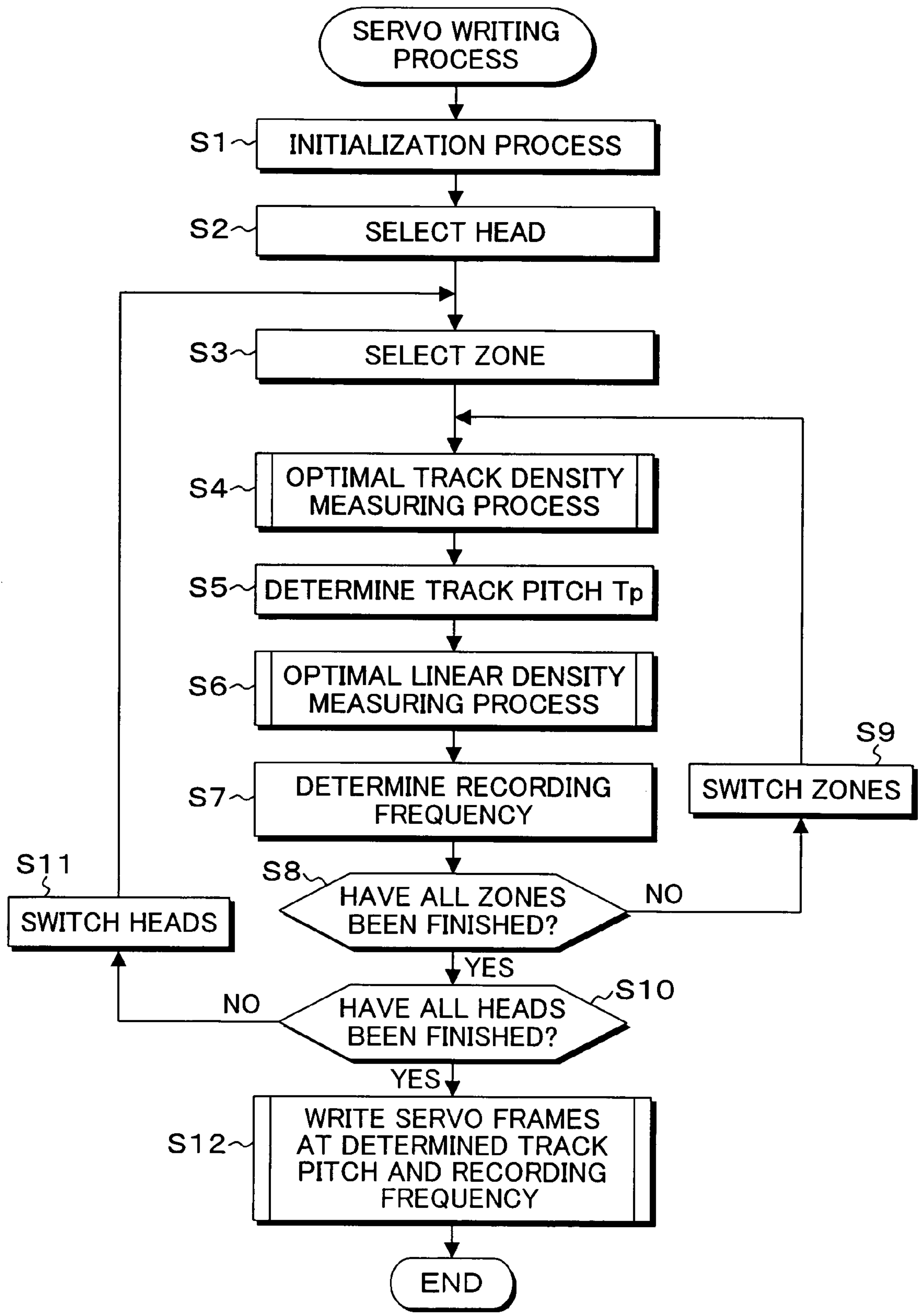
FIG. 8 is a flowchart of a servo writing process according to the embodiment of FIG. 1.

FIG. 8 is a flowchart of a servo writing process according to the embodiment of FIG. 1. In FIG. 8, in the servo writing process, the servo writing process is executed by sending a servo writing command prepared as a specific command, from a personal computer, etc. externally connected with the host interface 30 in the stage where fabrication of the hard disk drive 10 of FIG. 1 has been completed. In this servo writing process, after a initialization process has been executed at a step S1, the head 22-1, for example, is selected at a step S2 and, then, the outer zone is selected first at a step S3. Then, a test pattern is written in the state where the head is positioned in the zone center of the outer zone, and an optimal track density measuring process is executed at a step S4, and the track pitch TP is determined at a step S5. Next, similarly, a test pattern is written in the state where the head is positioned in the zone center of the outer zone, and an optimal linear density measuring process is executed at a step S6, and the recording frequency is determined at a step S7. Then, whether or not the above processes have been completed for all zones is checked at a step S8 and, because the head is positioned in the outer zone first, the head is shifted to the inner zone at a step S9 and the process from the step S4 is repeated for the inner zone. When the completion of the process has been determined at a step S8, the process is advanced to a step S10 at which whether or not the process have been completed for all of the heads is checked. Because it is the time when the process for the first head 22-1 has been completed, the head 22-1 is switched to the next head 22-2 at a step S11 and the process is advanced to the step S3. Then, the same process as that executed for the head 22-1 is repeated. When the completion of the process for all of the heads has been confirmed at a step S10, the process is advanced to a step S12 at which writing of servo frames is executed at the determined track pitch and the recording frequency.

Figure 9:
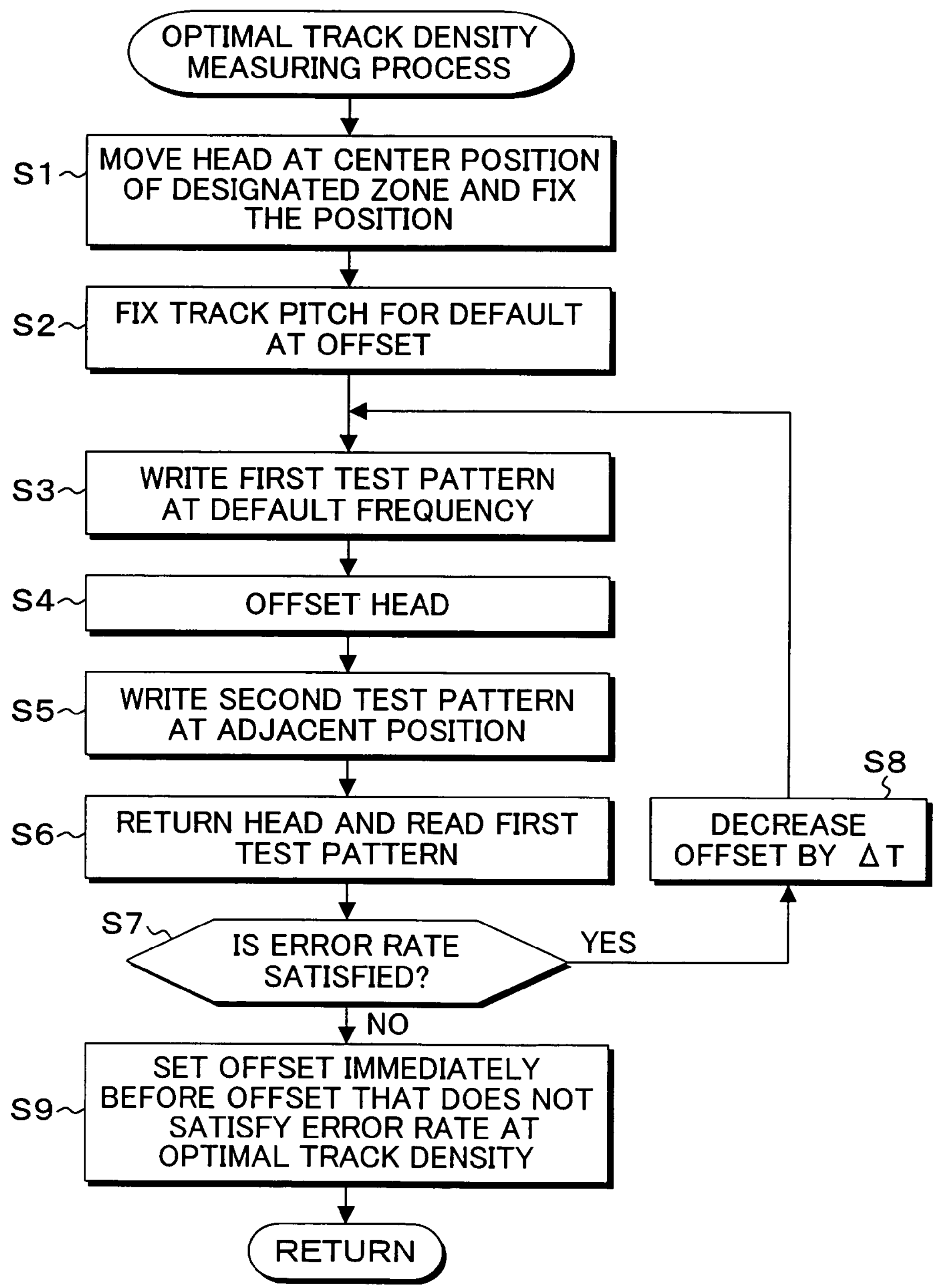
FIG. 9 is a flowchart of an optimal track density measuring process of FIG. 8.

FIG. 9 is a flowchart of the optimal track density measuring process of the step S4 of FIG. 8. In the optimal track density measuring process, the head is moved to the center position of a designated zone and the position is fixed at a step S1, the track pitch of default is set at the offset at a step S2 and a first test pattern is written at the default frequency at a step S3. Because the writing of the first test pattern at the step S3 is writing in a state where servo frames are not recorded at all, as to the starting position of the writing, data writing according to, for example, a predetermined sector format is executed taking an index signal obtained from the spindle motor 16 of FIG. 1, as the starting point. At the next step S4, the head is offset by a track pitch of the default. Thereafter, a second test pattern having a bit composition that breaks the test pattern of FIG. 2 is written at an adjacent position at a step S5. For example, the second test pattern that is, for example, inverted against the first test pattern at the step S3 is written as the adjacent test pattern. Next, the head is returned to the position of the first test pattern and first test pattern is read at a step S6 and whether or not the error rate is satisfied is checked at a step S7. In the case of the default track pitch, the error rate is always satisfied first because the default track pitch has room compared to the optimal track. Therefore, the process is advanced to a step S8 at which the offset is reduced by a predetermined amount and, thereafter, the process is advanced to a step S3 at which writing of the first test pattern is again executed. Then, the head is offset at a step S4 and the second test pattern is written at a step S5. Thereafter, the head is returned and the first test pattern is read at a step S6 and the process for determining whether or not the error rate is satisfied is repeated at a step S7. By repeating the process described above, the first test pattern and the second test pattern adjacent thereto are recorded reducing the offset and, when the error rate is not satisfied, the process is advanced to a step S9 at which an offset immediately before an offset that does not satisfy the error rate is set as the optimal track density. The optimal track density obtained as described above gives the optimal track pitch TP. However, because the obtained density is a value close to the limit of the error rate when the obtained density is used as it is, a value having a margin, obtained by increasing the offset value by an amount corresponding to a predetermined rate is determined to be a track pitch TP corresponding to the optimal track pitch.

Figure 10:
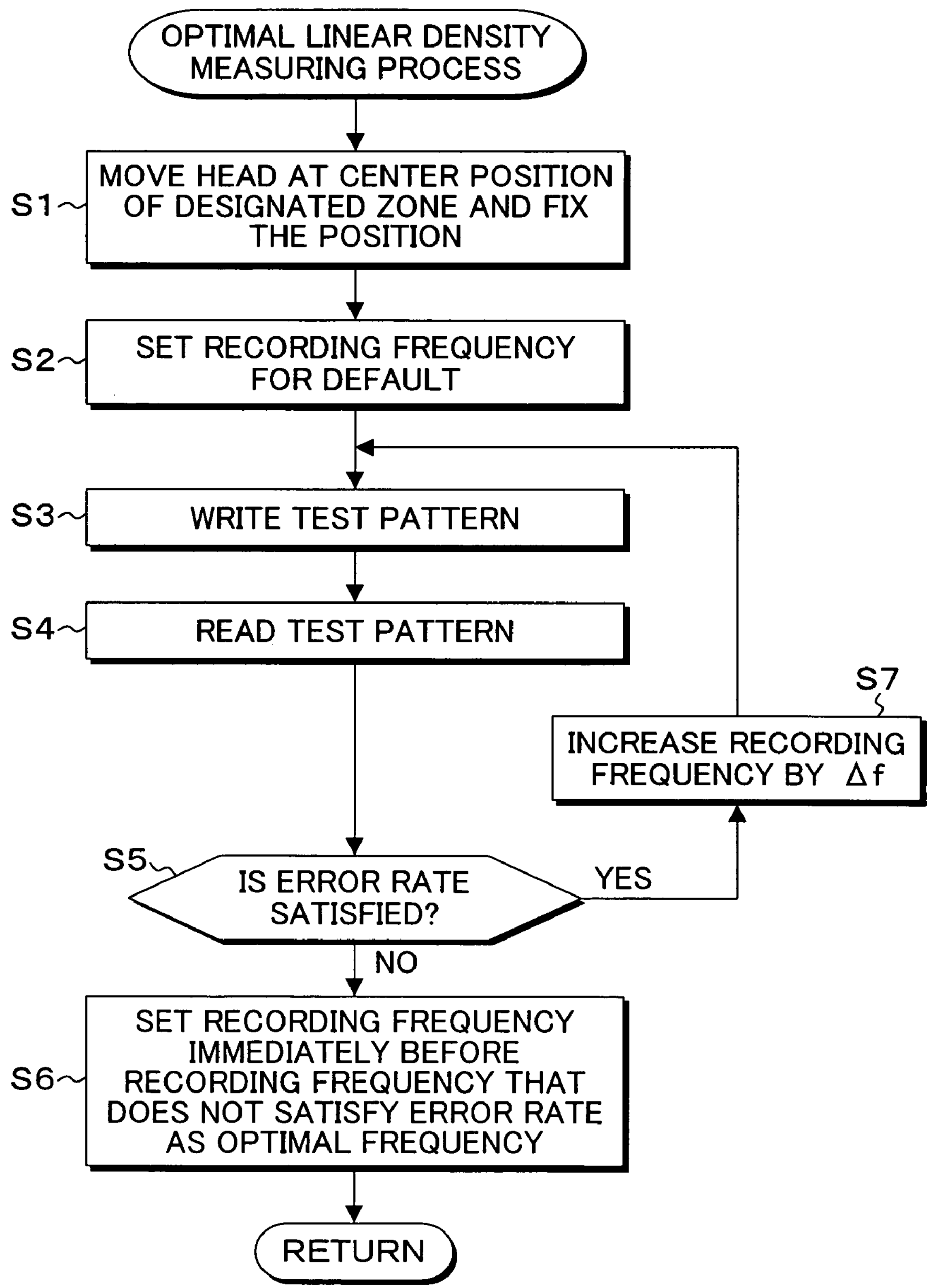
FIG. 10 is a flowchart of an optimal linear density measuring process of FIG. 8.

FIG. 10 is a flowchart of the optimal linear density measuring process of the step S6 of FIG. 8. In the optimal linear density measuring process, the head is moved to a position at the center of a designated zone and the position is fixed at a step S1 and, thereafter, the recording frequency of the default is set at a step S2 and a test pattern is written at a step S3. Then, the test pattern is read at a step S4 and whether or not the error rate is satisfied is checked at a step S5. The error rate is satisfied first because a relatively low frequency is used as the recording frequency of the default. Therefore, the process is advanced to a step S7 at which the recording frequency is increased by a predetermined value. Thereafter, the test pattern is written again at a step S3, the test pattern is read at a step S4 and the process for determining whether or not the error rate is satisfied is repeated at a step S5. If the error rate is not satisfied at the step S5, the process is advanced to a step S6 at which a recording frequency immediately before a recording frequency that does not satisfy the error rate is set to be the optimal frequency. Because this optimal frequency is a value immediately before the limit for the error rate, the recording frequency is reduced by multiplying the recording frequency having been set a predetermined rate and the recording frequency obtained is the optimal recording frequency.

Figure 11:
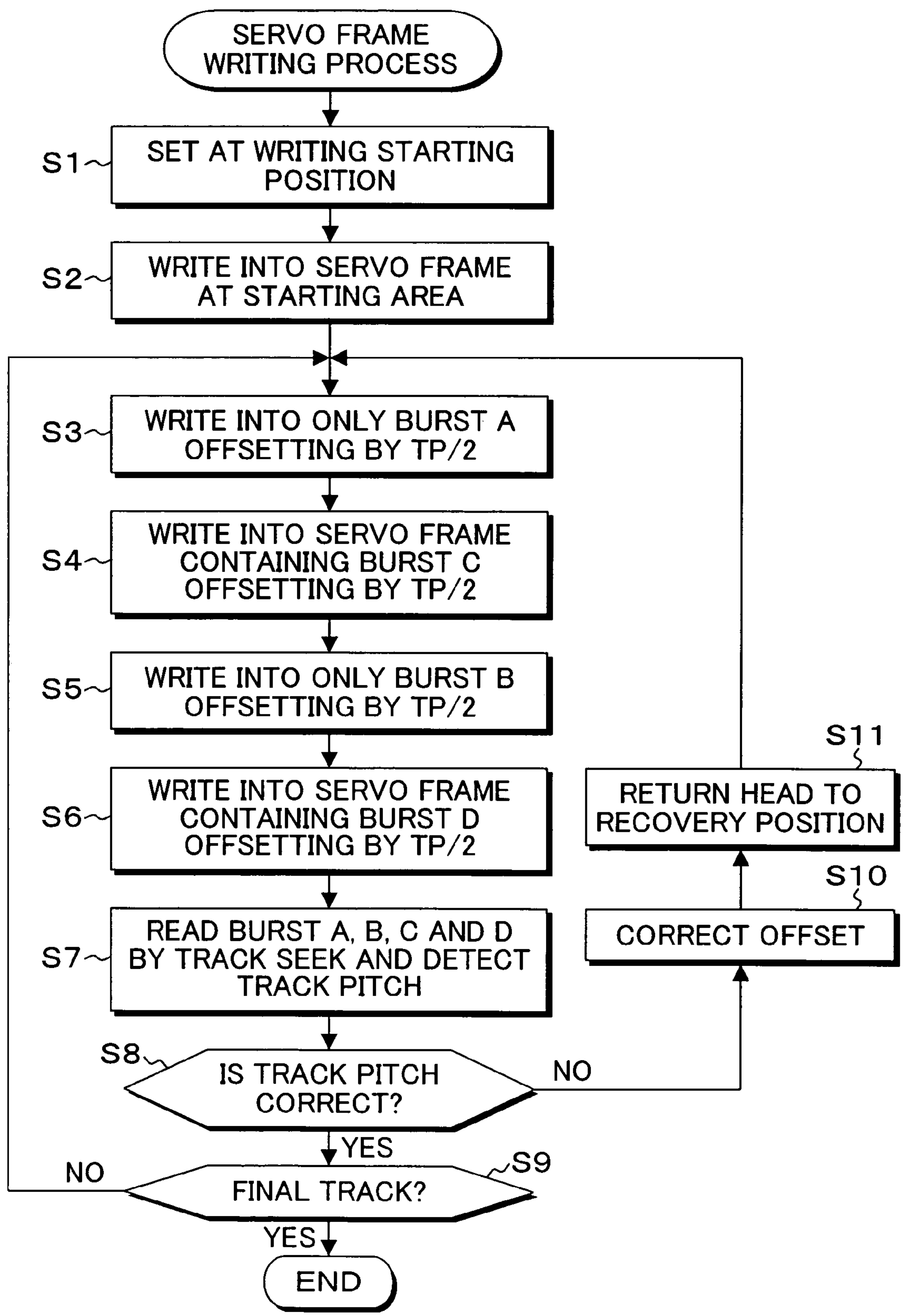
FIG. 11 is a flowchart of a servo frame writing process of FIG. 8.

FIG. 11 is a flowchart of the servo frame writing process of the step S12 of FIG. 8. In this servo frame writing process, after the head has been set at the starting position for writing at a step S1, writing of servo frames is executed in the starting area at a step S2. This setting of the starting position for writing and the writing of the servo frames in the starting area are a process for, after, for example, the head is positioned at the outermost portion of the contact start/stop area 82 of FIG. 4, recording the servo frames containing the bursts B and D for two (2) tracks of the cylinder address 00 and executing writing of the servo frames containing the burst D corresponding to the track address 00, offsetting by TP/2. As the writing of the servo frames following the servo frame described above, the process of the steps S3 to S6 is repeated. That is, only the burst A is written offsetting the head by TP/2 at the step S3, then, the servo frame containing the burst C is written offsetting the head by TP/2 at the step S4, only the burst B is written offsetting the head by TP/2 at the step S5 and the servo frame containing the burst D is written offsetting the head by TP/2 at the step S6. By the writing at the steps S3 to S6, writing of, for example, the servo frames of the cylinder addresses 00 and 01 of FIG. 4 is completed. Then, the bursts A, B, C and D are read and the track pitch is detected by the track seeking for tracks for which writing has been completed, at a step S7. This track pitch is given using, for example, the spacing between zero crosses of the head position signal $E_N$ of FIG. 4. Whether or not this track pitch is correct is checked by determining whether the track pitch detected at the step S8 coincides with the track pitch TP that has been determined to be the optimal value, or whether or not the detected track pitch is within the tolerance defined in advance and, if the track pitch is correct, the process is advance to a step S9. Then, because the track is not the final track, the process returns to the step S3 at which writing of the bursts A, B, C and D one after another and writing of the servo frames corresponding to the bursts C and D are executed. If the track pitch is not correct at the step S8, the offset corresponding to TP/2, that has been used until then is corrected according to the extent of the error at a step S10, the head is returned to a recovery position at a step S11 and, thereafter, writing of the servo frames is executed again from the step S3. By the repetition of these steps S3 to S8, S10 and S11, recording of servo frames having the optimal track pitch TP determined always based on the correct track density is possible even when the head is moved by the control-by-current to the voice coil motor 18. Such writing of the servo frames is executed from the outer side to the inner side of the magnetic disk medium. Then, when a zone boundary is present on the way, the frequency is switched to the optimal frequency determined for the next zone at the time when the zone boundary is passed and the writing of the servo frames is executed. Then, when the final track is determined at a step S9, the writing is ended.

FIG. 12 is a flowchart of the seek control of the present invention for detouring the zone boundaries by switching the heads. In the seek control of FIG. 12, whether or not a target track address is in another zone is checked at a step S1 and, if the target track address is in another zone, the process is advanced to a step S2 at which track addresses of the first switching point before the zone boundary and the second switching point after the zone boundary are set. Then, seeking is started at a step S3 and, when arrival at the first point is determined at a step S4, the head is switched at a step S5. Then, when the second switching point is determined at a step S6, head switching to returning to the original head is executed at a step S7. Whether or not all boundaries between zones to be passed are passed is checked at a step S8 and, if not all of the boundaries are passed, the process is returned to the step S4 at which the head switching of the first point and the second point is executed for the next zone. When it is determined that all of the zone boundaries on the way has been passed, at a step S8, whether or not the present track address is the target track address is determined at a step S9 and, with arrival at the target track address, the process is advanced to a step S10 at which the head is pulled into the target track and the on-track control is started. Surely, in the case where the seeking control is started at the step S3, the control is switched to reducing-velocity control on a track a predetermined number of tracks before the target track and, after the velocity has been reduced to a predetermined low velocity on a track immediately before the target track by executing this reducing-velocity control, the pulling into an on-track state is execute data step S10. Furthermore, the present invention also provides a program for servo writing executed by the MPU 34 provided to the hard disk drive 10 of FIG. 1. This servo writing program is realized by hardware resource of a computer comprising the MPU 34, provided to the hard disk drive 10 of FIG. 1. The MPU 34 is provided with a CPU and a program ROM, invokes the servo writing program of the present invention from the program ROM when the MPU 34 is started up, displays the program on an RAM and executes the program using the CPU. The servo writing program of the present invention is realized as a procedure of the flowchart shown in FIG. 9 to FIG. 11. Moreover, the present invention also provides a seek control program for executing the head switching for detouring the zone boundaries and this seek control program has a content according to the flowchart of FIG. 12. The above embodiment takes an example of the self-servo writing for writing the servo frames into the unrecorded magnetic disk media. However, the writing of the servo pattern may be divided into two (2) stages. In this case, in a first stage, a pattern that fills the whole medium with reference is written and writing of the pattern called "propagation pattern" is executed by servo track writer equipment. In a second stage, a servo pattern specific to the apparatus is written immediately after the manufacture of the apparatus and, in this stage, the self-servo writing of the present invention for adjusting respectively the track density TPi and the linear density Bpi to the optimal values thereof is executed. The method for writing the servo frames into an unrecorded magnetic disk medium can take appropriate method other than the method described above as necessary. The present invention is not limited to the above embodiment, but encompasses any appropriate variations without impairing the object and the advantages thereof. The present invention is not restricted by the numerical values indicated in the above embodiment.

What is claimed is:

1. An information storage apparatus that records servo information and user data on a recording face of a storage medium, the information storage apparatus comprising:

a recording density measuring unit configured to measure an optimal recording density of a recording face corresponding to each head for a storage medium having no servo information recorded thereon; and a servo information writing unit configured to vary a recording density for each head such that the recording density reaches the optimal recording density measured by the recording density measuring unit, to thereby write the servo information onto the storage medium having no servo information recorded thereon, wherein the recording density measuring unit measures a respective optimal recording density for each of a plurality of zones obtained by radially dividing the recording face, for each of the zones of the recording face, the servo information writing unit writes the servo information varying the recording density for each head such that the recording density reaches the optimal recording density, the servo information writing unit writes the servo information onto the opposite recording faces of the storage medium such that positions of boundaries between zones in the radial direction having different recording densities are different from each other, and the information storage apparatus further comprises a seek control unit configured to switch the heads such that the zone boundary on the recording face having a target track is detoured during a seeking operation that moves the head to the position of the target track.

2. An information storage apparatus according to claim 1, wherein the recording density measuring unit includes:

a track density measuring unit arranged to measure an optimal track density of a recording face corresponding to each head; and a linear density measuring unit arranged to measure an optimal linear density for each recording face, wherein the servo information writing unit writes the servo information, for each head, varying a track pitch to a track pitch corresponding to the optimal track density measured by the track density measuring unit and varying a recording frequency to a recording frequency corresponding to the optimal linear density measured by the linear density measuring unit.

3. An information storage apparatus according to claim 2, wherein the track density measuring unit:

writes first test data with a head moved to a predetermined position in the radial direction of the recording medium;

writes second test data at a position adjacent to the predetermined position with the head offset by one track;

reads the first test data and determines whether or not a predefined error rate is satisfied;

if the error rate is satisfied, repeats the determination of error rate satisfaction by the writing of the second test data and the reading of the first test data, reducing gradually the offset of the second track until the error rate becomes unsatisfied; and determines the optimal track density based on the value of an offset immediately before an offset that does not satisfy the error rate.

4. An information storage apparatus according to claim 2, wherein the linear density measuring unit:

after setting a predetermined recording frequency and writing test data with the head moved to a predetermined position in the radial direction of the recording medium, reads the test data and determines whether or not a predefined error rate is satisfied;

if the error rate is satisfied, repeats the determination of error rate satisfaction by the writing of the test data and the reading of the test data, increasing gradually the recording frequency until the error rate becomes unsatisfied; and determines the optimal linear density based on a recording frequency immediately before a recording frequency that does not satisfy the error rate.

5. An information storage apparatus according to claim 1, wherein the recording density measuring unit includes:

a track density measuring unit arranged to measure an optimal track density of a recording face corresponding to each head; and a linear density measuring unit arranged to measure an optimal linear density for each zone, wherein the servo information writing unit writes the servo information, for each zone, varying a track pitch to a track pitch corresponding to the optimal track density measured by the track density measuring unit and varying a recording frequency to a recording frequency corresponding to the optimal linear density measured by the linear density measuring unit.

6. A control method for an information storage apparatus that records servo information and user data on a recording face of a storage medium, the control method comprising:

a recording density measuring step of measuring an optimal recording density of a recording face corresponding to each head for a storage medium having no servo information recorded thereon; and a servo information writing step of varying a recording density for each head such that the recording density reaches the optimal recording density measured at the recording density measuring step, to write the servo information onto the storage medium having no servo information recorded thereon, wherein the recording density measuring step includes measuring a respective optimal recording density for each of a plurality of zones obtained by radially dividing the recording face, the servo information writing step includes, for each of the zones of the recording face, writing the servo information while varying the recording density for each head such that the recording density reaches the optimal recording density, the servo information writing step includes writing the servo information onto opposite recording faces of the storage medium such that positions of boundaries between zones in the radial direction having different recording densities are different from each other, and the control method further comprises a seek control step of reading the servo information while switching the head such that the zone boundary on the recording face having a target track is detoured during a seeking operation that moves the head to the position of the target track.

7. A control method for an information storage apparatus according to claim 6, wherein the recording density measuring step includes:

a track density measuring step of measuring an optimal track density of a recording face corresponding to each head; and a linear density measuring step of measuring an optimal linear density for each recording face, wherein the servo information writing step includes writing the servo information, for each head, while varying a track pitch to a track pitch corresponding to the optimal track density measured at the track density measuring step and varying a recording frequency to a recording frequency corresponding to the optimal linear density measured at the linear density measuring step.

8. A control method for an information storage apparatus according to claim 7, wherein the track density measuring step includes:

writing first test data with a head moved to a predetermined position in the radial direction of the recording medium;

writing second test data at a position adjacent to the predetermined position with the head offset by one track;

reading the first test data to determine whether or not a predefined error rate is satisfied;

if the error rate is satisfied, repeating the determination of error rate satisfaction by the writing of the second test data and the reading of the first test data, while reducing gradually the offset of the second track until the error rate becomes unsatisfied; and determining the optimal track density based on the value of an offset immediately before an offset that does not satisfy the error rate.

9. A control method for an information storage apparatus according to claim 7, wherein the linear density measuring step includes:

after setting a predetermined recording frequency and writing test data with the head moved to a predetermined position in the radial direction of the recording medium, reading the test data to determine whether or not a predefined error rate is satisfied;

if the error rate is satisfied, repeating the determination of error rate satisfaction by the writing of the test data and the reading of the test data, while increasing gradually the recording frequency until the error rate becomes unsatisfied; and determining the optimal linear density based on a recording frequency immediately before a recording frequency that does not satisfy the error rate.

10. A control method for an information storage apparatus according to claim 6, wherein the recording density measuring step includes:

a track density measuring step of measuring an optimal track density of a recording face corresponding to each head; and a linear density measuring step of measuring an optimal linear density for each zone, wherein the servo information writing step includes writing the servo information, for each zone, while varying a track pitch to a track pitch corresponding to the optimal track density measured at the track density measuring step and varying a recording frequency to a recording frequency corresponding to the optimal linear density measured at the linear density measuring step.

11. A program stored on a computer readable medium operable to drive a computer of an information storage apparatus that records servo information and user data on a recording face of a storage medium to execute, the program comprising:

a recording density measuring step of measuring an optimal recording density of a recording face corresponding to each head for a storage medium having no servo information recorded thereon; and a servo information writing step of varying a recording density for each head such that the recording density reaches the optimal recording density measured at the recording density measuring step, to write the servo information onto the storage medium having no servo information recorded thereon;

wherein the recording density measuring step includes measuring a respective optimal recording density for each of a plurality of zones obtained by radially dividing the recording face, the servo information writing step includes, for each of the zones of the recording face, writing the servo information while varying the recording density for each head such that the recording density reaches the optimal recording density, the servo information writing step includes writing the servo information onto opposite recording faces of the storage medium such that positions of boundaries between zones in the radial direction having different recording densities are different from each other, and the program further comprises a seek control step of reading the servo information while switching the head such that the zone boundary on the recording face having a target track is detoured during a seeking operation that moves the head to the position of the target track.

12. A program according to claim 11, wherein the recording density measuring step includes:

a track density measuring step of measuring an optimal track density of a recording face corresponding to each head; and a linear density measuring step of measuring an optimal linear density for each recording face, wherein the servo information writing step includes writing the servo information, for each head, while varying a track pitch to a track pitch corresponding to the optimal track density measured at the track density measuring step and varying a recording frequency to a recording frequency corresponding to the optimal linear density measured at the linear density measuring step.

13. A program according to claim 12, wherein the track density measuring step includes:

writing first test data with a head moved to a predetermined position in the radial direction of the recording medium;

writing second test data at a position adjacent to the predetermined position with the head offset by one track;

reading the first test data to determine whether or not a predefined error rate is satisfied;

if the error rate is satisfied, repeating the determination of error rate satisfaction by the writing of the second test data and the reading of the first test data, while reducing gradually the offset of the second track until the error rate becomes unsatisfied; and determining the optimal track density based on the value of an offset immediately before an offset that does not satisfy the error rate.

14. A program according to claim 12, wherein the linear density measuring step includes:

after setting a predetermined recording frequency and writing test data with the head moved to a predetermined position in the radial direction of the recording medium, reading the test data to determine whether or not a predefined error rate is satisfied;

if the error rate is satisfied, repeating the determination of error rate satisfaction by the writing of the test data and the reading of the test data, while increasing gradually the recording frequency until the error rate becomes unsatisfied; and determining the optimal linear density based on a recording frequency immediately before a recording frequency that does not satisfy the error rate.

15. A program according to claim 11, wherein the recording density measuring step includes:

a track density measuring step of measuring an optimal track density of a recording face corresponding to each head; and a linear density measuring step of measuring an optimal linear density for each zone, wherein the servo information writing step includes writing the servo information, for each zone, while varying a track pitch to a track pitch corresponding to the optimal track density measured at the track density measuring step and varying a recording frequency to a recording frequency corresponding to the optimal linear density measured at the linear density measuring step.

* * * * *